US012202095B2

(12) United States Patent
Ackermann et al.

(10) Patent No.: US 12,202,095 B2
(45) Date of Patent: Jan. 21, 2025

(54) MODULAR CLAMPING DEVICE

(71) Applicant: Agathon AG, Maschinenfabrik, Bellach (CH)

(72) Inventors: Thomas Ackermann, Kestenholz (CH); Jürg Marti, Solothurn (CH)

(73) Assignee: Agathon AG, Maschinenfabrik, Bellach (CH)

(*) Notice: Subject to any disclaimer, the term of this patent is extended or adjusted under 35 U.S.C. 154(b) by 658 days.

(21) Appl. No.: 17/007,444

(22) Filed: Aug. 31, 2020

(65) Prior Publication Data

US 2021/0069858 A1 Mar. 11, 2021

(30) Foreign Application Priority Data

Sep. 11, 2019 (CH) ..................................... 1145/19

(51) Int. Cl.
*B24B 41/06* (2012.01)
*B24B 3/34* (2006.01)
(Continued)

(52) U.S. Cl.
CPC .............. *B24B 41/061* (2013.01); *B24B 5/02* (2013.01); *B24B 5/04* (2013.01); *B24B 49/045* (2013.01);
(Continued)

(58) Field of Classification Search
CPC ..... B24B 41/061; B24B 41/062; B24B 41/04; B24B 41/06; B24B 49/045; B24B 49/05;
(Continued)

(56) References Cited

U.S. PATENT DOCUMENTS 3,754,357 A * 8/1973 Schnellmann ............ B24B 1/00 451/54
4,416,570 A * 11/1983 Argenbright ......... B23Q 1/5406 409/222
(Continued)

FOREIGN PATENT DOCUMENTS

CN 203357156 U * 12/2013
DE 102013213176 B4 * 1/2015 ........... B24B 41/061
(Continued)

OTHER PUBLICATIONS

DE102013213176B4 English Translation (Year: 2015).*
CN203357156U English Translation (Year: 2013).*
EP-2161101-A2 EspaceNet English Translation (Year: 2010).*

*Primary Examiner* — Makena S Markman
(74) *Attorney, Agent, or Firm* — Tucker Ellis LLP

(57) ABSTRACT

A clamping device for holding a workpiece, in particular a cutting tool, during machining in a grinding machine, wherein peripheral grinding of the workpiece is performed by means of a particularly approximately cup-shaped grinding wheel, wherein the clamping device comprises a support unit provided to be mounted on the grinding machine, a clamping unit comprising a clamping anvil supported in a clamping anvil holding element and translationally drivable to apply a clamping force parallel to a clamping axis, and a drive unit comprising a drive anvil supported in a drive axis and rotationally drivable for rotary orientating the workpiece by means of the drive axis. The clamping unit and the drive unit are provided as individual components, which are releasably or slidably attached to the support unit to form a workpiece spindle headstock of the grinding machine.

12 Claims, 7 Drawing Sheets

(51) Int. Cl.

| | |
|---|---|
| ***B24B 5/02*** | (2006.01) |
| ***B24B 5/04*** | (2006.01) |
| ***B24B 49/04*** | (2006.01) |
| ***B25B 1/10*** | (2006.01) |
| *B24B 49/12* | (2006.01) |

(52) U.S. Cl.
CPC .............. *B25B 1/106* (2013.01); *B24B 3/343* (2013.01); *B24B 41/062* (2013.01); *B24B 41/066* (2013.01); *B24B 49/12* (2013.01)

(58) Field of Classification Search
CPC ......... B24B 49/03; B24B 49/12; B24B 3/343; B24B 3/024; B24B 5/04; B24B 5/42; B24B 47/12; B24B 19/12; B25B 1/106
See application file for complete search history.

(56) References Cited

U.S. PATENT DOCUMENTS

| | | | | | |
|---|---|---|---|---|---|
| 4,930,265 | A * | 6/1990 | Belthle | B23G 1/36 | 451/48 |
| 5,056,766 | A | 10/1991 | Engibarov | | |
| 8,500,518 | B2 * | 8/2013 | Mueller | B24B 3/343 | 451/57 |
| 2003/0232584 | A1 * | 12/2003 | Tomotaki | B24B 47/12 | 451/242 |
| 2012/0129434 | A1 * | 5/2012 | Hackman | B24B 3/024 | 29/27 R |

FOREIGN PATENT DOCUMENTS

| | | | | |
|---|---|---|---|---|
| EP | 1579955 | A1 | 9/2005 | |
| EP | 2161101 | A2 * | 3/2010 | B24B 3/343 |

* cited by examiner

MODULAR CLAMPING DEVICE

TECHNICAL FIELD

The invention relates to a modular clamping device for a grinding machine for peripheral grinding of workpieces such as a cutting tool. The present invention relates also to a grinding machine.

BACKGROUND OF THE INVENTION

Grinding machines for grinding of cutting tools are known in which a grinding tool, in particular designed as a cup-shaped grinding wheel, grinds the cutting tool. Hereinafter, the workpiece to be machined is referred generally as a cutting tool, for example designed as an indexable insert. A cup-shaped grinding wheel comprises a grinding ring providing an annular front face, named grinding rim, provided with an abrasive coating. Furthermore, the cup-shaped grinding wheel can be designed such that grinding can also be performed with a peripheral lateral surface of the grinding ring, which may be cylindrical and/or conical on the outside and/or inside. A rotationally drivable grinding spindle carries the cup-shaped grinding wheel. The grinding spindle is mounted in a bearing block of a grinding spindle headstock and is driven by a grinding spindle motor. The bearing block can be mounted on a slide to be axially and radially displaceable, in particular in X-direction and Y-direction, wherein all movements are controlled for example by a central CNC control. Depending on the equipment of the grinding machine type, additional dressing and cleaning devices may be mounted on the grinding spindle headstock as well as means for lubrication.

In general, cutting plates or cutting tools, such as indexable inserts, not only vary in the material but also can have various basic geometric shapes such as square, triangle, diamond rhomboid, rectangle, hexagon and/or round. It is known, that for example replaceable indexable cutting inserts consists generally of prismatic blocks having polygonal faces, in particular a topside and an underside, which are connected together by a peripherally extending side surface comprising a plurality of surface portions, in particular flank face and rank face.

For the machining of a workpiece, in particular for the grinding of a cutting tool, a clamping device can be used in which the workpiece is mounted in a holding fixture adjacent to the grinding tool to expose a face of the workpiece to be ground. The clamping device is provided to ensure a constant clamping pressure for accuracy and repeatability during grinding processes against impact of forces. It is known, that the workpiece is disposed and rigidly clamped between two coaxially arranged cylinder-type clamping elements, such as a plunger or anvil, which are receive in a C-shaped yoke of the clamping device. At least one of the plungers is axially movable for clamping the workpiece to be machined against the other by applying an axial clamping force. The other clamping element, the second plunger or anvil, forms an abutment in order to support the clamping force for holding the workpiece in a defined orientation. The clamping force can be forwarded by means of a transmission element and may be applied by a rocker construction or lever construction. Since the workpiece is only clamped frictionally between the plungers, a high axial and constantly applied clamping force is required. The second plunger on one leg of the C-shaped yoke is configured to support this high clamping force.

The workpiece to be accommodated in the clamping device can have at least parallel surfaces such that in the clamped state each of them abuts against one of the end faces of the clamping elements. However, non-parallel surfaces are known as well. If the workpiece to be ground, i.e. a cutting tool, has a hole, the workpiece can be centrically positioned in the clamping device by a centering plunger disposed on one of the clamping elements.

It is known, that the clamping device forms part of a so-called workpiece spindle headstock, which is an assembly group mountable on the grinding machine, e.g. by a rotary plate and provided to move the clamped workpiece about a plurality of independent rotary axes. The workpiece spindle headstock comprises a casting providing at least a holding structure for the clamping device and is secured by any desired means to the grinding machine. The casting is designed in one block, mostly in a C-shape form, to provide rigidity. At one end of the casting one part of the clamping device, comprising at least the axially drivable clamping element, hereafter called clamping anvil, and on another end of the casting a so-called drive unit, comprising at least a clamping element rotatable about a clamping axis, the so-called B-axis, hereafter called drive anvil, are arranged. In general, the clamping device is a complex device with a large size resulting in a large casting for holding the clamping device.

For the grinding of a clamped workpiece, such as a cutting tool, the cup-shaped grinding wheel of the grinding machine is controlled and guided in axial and radial directions to come into contact with the surfaces of the indexable insert to be ground. Due to rotation of the clamped workpiece about the B-axis, the cup-shaped grinding wheel can process the entire peripheral surface of the clamped workpiece, for example a clamped indexable insert. Furthermore, thanks to a pivoting movement by rotating the clamping device about an axis, perpendicular to the B-axis, named A-axis, thanks to a rotational movement about the B-axis and thanks to translational and/or rotational movements of the grinding wheel about at least a X-axis and a Y-axis the peripheral surface of the clamped cutting tool can be theoretically ground. Therefore, four or even five axis grinding machines are known with for example rotational axis, in particular A-axis, B-axis and C-axis for movement of the workpiece and furthermore, translational axis, in particular X-axis and Y-axis related to the grinding tool.

For grinding the different regions or areas of a cutting tool such as an indexable insert, the orientation of the determined surfaces of the workpiece to be ground have to be parallel to the abrasive surfaces of the cup-shaped grinding wheel or in general of the grinding tool. One disadvantage of prior art clamping devices used in a grinding machine with cup-shaped grinding wheel is that due to their size, the clamping device can hardly be pivoted into the cup-shaped grinding wheel for the appropriate positioning of the clamped cutting tool for grinding one of the plan or flat surfaces of the cutting tool or in other appropriate grinding positions. Since the available space is relatively limited, contact between the clamping device and the grinding tool may occur.

Therefore, a known loading device is provided such to unclamp the indexable insert and clamp it in another position to perform the next step of grinding. Nevertheless, the overall time required to grind an indexable insert comprising the steps of clamping, unclamping and adjusting is increased and therefore the throughput of the grinding process is reduced.

It is as well known to perform the entire grinding process in one setting by providing at least one of the clamping elements in a long version, such that the clearance between the two ends of the C-shaped casting is wide enough for positioning the workpiece by pivoting the clamping device into the cup-shaped grinding wheel, is for example disclosed in EP 1 579 955. However, due to the long longitudinal axis path provided by the one clamping element, in particular a clamping ram, a reduction in the stiffness of the clamping device be caused, resulting in inferior processing results. Furthermore, due to the C-shape of the holding element of the clamping device according to EP 1 579 955, wherein in one leg the clamping ram is accommodated which apply a high axial clamping force, bending of this leg can result and further deviation of the two clamping rams from the exact axial alignment can be caused.

U.S. Pat. No. 5,056,766 suggests, in order to avoid a re-clamping of the indexable insert to mount the clamping device slidably such that the entire clamping device can be moved along a plane surface of the cup-shaped grinding wheel. This requires guiding means on the grinding machine, whereby due to the high requirements for accuracy the cost of such a grinding machine increases.

DISCLOSURE OF THE INVENTION

The invention is based on a clamping device for a grinding machine of the type initially cited in the prior art. Object of the invention is related to a clamping device for grinding machines provided to produce cutting tools, such as indexable inserts economically and with high quality according to predetermined dimensional, shape and positional tolerances by circumferential and contour grinding, which allows a high flexibility of grinding in one setting.

Furthermore, the clamping device can be combined with measuring means to determine for example a thickness of each individual workpiece to be clamped in the clamping device. Advantageously the geometry to be machined can be adapted according to the workpiece geometry and can provide smooth transition zone between different faces and radii The object is achieved to provide a clamping device, which allows for adjusting the mounting clearance for clamping a workpiece, in particular a cutting tool, according to determined requirements set by grinding conditions for grinding the entire peripheral surface of the cutting tool with a cup-shaped grinding wheel.

According to the invention, a clamping device is provided for holding a workpiece, in particular a cutting tool, during machining in a grinding machine, wherein peripheral grinding of the workpiece is performed by means of a particularly approximately cup-shaped grinding wheel.

The clamping device comprises a support unit, provided to be mounted on the grinding machine, a clamping unit, which clamping unit comprises a clamping anvil supported in a clamping anvil holding element and movable in translation along a clamping axis to apply a clamping force, and a drive unit, which drive unit comprises a drive anvil connectable to a drive axis of the grinding machine and is rotationally drivable for rotary orientation of the workpiece by means of the drive axis, wherein the clamping unit and the drive unit are provided as individual components, wherein at least one of the drive unit and the clamping unit is attached releasably or slidably attached to the support unit to form a workpiece spindle headstock of the grinding machine.

The clamping device is provided as an assembly group mountable on a grinding machine and consists of the clamping unit, the drive unit and the support unit.

The clamping unit comprises at least the clamping anvil rotatably supported and axially movable. The clamping anvil comprises a clamping shaft rotatably supported by means of bearings in radial and axial directions in the clamping holding element and a clamping pin. The clamping pin is interchangeably and coaxially inserted in the clamping shaft at an end protruding out of the clamping holding element. The clamping anvil is drivable for translational movement in the longitudinal direction of the clamping axis to apply the clamping force for holding the workpiece between the clamping anvil and the drive anvil. The clamping force acting in axial direction may be applied to the clamping anvil by transmission means, which are provided to transmit the clamping force preferably without any other force components as an axial force component, generated by an actuating device. The actuating device to generate the axial clamping force can be a pneumatic or hydraulic cylinder unit with an actuating rod, which is arranged preferably parallel to the clamping axis and which acts on the transmission means. The transmission means comprise a lever device, which will be described in more details later.

The drive unit forms a counter part to the clamping unit and forms an abutment in order to support the applied clamping force. The drive unit comprises the drive anvil, which comprises a drive shaft and an interchangeable drive pin. The drive shaft extending coaxially with the clamping axis can be rotationally driven by a drive axis of the grinding machine, a so-called B-axis. For example, the drive shaft can be inserted with a shaft cone into a receiving cone of the B-axis. The drive axis can be fixed in a drive axis bearing of a drive holding element, rigidly supported and having a very exact concentricity. On the drive shaft is provided to fasten the workpiece in a centering manner. For example, the drive pin can be designed for centering fastening the workpiece or alternatively, the drive anvil can be provided such that at one end a centering plunger can be fastened by a threaded part, which is screwed in a graduate bore provided in longitudinal direction in the drive anvil.

The drive shaft is rotationally driven about the B-axis by an actuator and is axially immovable. Rotating about the B-axis causes the clamped workpiece, in particular the clamped cutting tool to rotate. The drive anvil and the clamping anvil aligned with high precision form a clamping system to clamp the workpiece to be ground in an affixed manner between ends of the clamping pin and the drive pin, respectively, facing each other.

The support unit is precisely mountable to a machine table of the grinding machine carrying the B-axis in such a manner that the clamping axis of the clamping device is aligned with the B-axis. For this purpose the support unit according to one embodiment of the invention, provides on a contact face to the machine table guiding elements, which can be mounted in appropriate guides of the machine table, which extends in a direction parallel to the B-axis. In this direction, the support unit is positionable so that the drive shaft of the drive unit can be coupled with the B-axis. Alternatively, the support unit can be mounted via a rotary plate to the grinding machine such to be rotational driven about further rotational axis.

In one embodiment, at least one of the clamping unit and the drive unit is slidably attached to the support unit, which is shaped as a support plate. In order to precisely position the at least one slidable unit in a direction parallel to the clamping axis, linear guide elements are provided on a surface of the support unit carrying the clamping unit and the drive unit, matching to corresponding guide elements provided at the opposite surface of the clamping unit and/or the drive unit. The position of the drive unit and the clamping unit relative to each other can be defined or chosen by a user for example by means of a control unit. Guide elements are well known in the art, i.e. a dovetail guide, to guide precisely units along a guidance path with high rigidity. Further, means to securely fix the positioned clamping unit and/or drive unit are known as well. The possibility of adjusting the clearance between the clamping unit and the drive unit, allows that the clamping unit and/or the drive unit can be provided in a so-called long version with more flexibility and in a so-called short-version with more stiffness.

For example, the long version of the drive unit comprises a drive pin extending from the drive holding element in the longitudinal direction of the clamping axis further than in the short version in order to increase the distance between the drive holding element and the clamped workpiece. Alternatively or additionally, the clamping pin of the long version of the clamping unit extends in its longitudinal extension further than in the short version, such that the distance between the clamped workpiece and the clamping holding element is increased. According to the greater distances provided by the long clamping pin and the long drive pin the free access of the grinding wheel to the clamped workpiece is increased. In other words, the free space on both sides of the clamped workpiece, in particular the cutting tool, is increased for positioning the clamped workpiece towards the cup-shaped grinding wheel. Advantageously, according to an improved accessibility of the workpiece to be ground more complex structures and geometries can be machined. Furthermore, according to the invention the clamping unit and the drive unit can be displaced to a determined position without changing the distance between the clamping unit and the drive unit such that the workpiece to be machined can be positioned at any position along the clamping axis. Therefore, a center of rotation of the workpiece about the machine axis lies not any longer at the workpiece itself but outside of the workpiece which allows new possibilities to perform a grinding process.

The clamping device can be mounted as a module or an assembly on a rotary driven axis of a conventional grinding machine without requiring an increased space. Therefore, the grinding machine can be constructed with high stiffness to be used for high productive grinding.

In another embodiment of the invention, the support unit has an L-shape with one part, identified as a first leg, substantially perpendicular protruding from a supporting surface. In the first leg, a bore is provided, wherein the axis of the bore extends parallel to the longitudinal extension of the supporting surface and coaxially to the clamping axis. In the bore of the leg, configured as a bearing bore, one of the clamping unit and the drive unit is inserted and supported while the other of these, is attached releasably to the support unit, in particular to the supporting surface. In order to adjust the clearance between the clamping unit and the drive unit necessary for arranging the clamped workpiece relative to the grinding surface of the cup-shaped grinding wheel an appropriate version of the clamping unit or the drive unit is selected.

For example, if not only the circumference but also a peripheral contour of the workpiece have to be ground a large pivoting range of the cup-shaped grinding wheel relative to the workpiece is required. For this purpose, the clamping unit in the long version can be attached to the support unit to provide a more flexible configuration. This clamping unit in the long version provides a large distance to the clamped workpiece on the side of the clamping device. Interchanging of the complete clamping unit is easily to perform and needs no further adjustment or calibration. According to the interchange of at least one of the clamping unit and the drive unit, the clearance between the clamping unit and the drive unit is adjustable. Therefore, contact between the workpiece spindle headstock and the cup-shaped grinding wheel by positioning can be avoided. Advantageously, the long and the short version of the clamping unit and/or the drive unit can be arranged outside of the grinding machine and can be exactly positioned on the grinding machine without further adjustment and calibration.

Preferably, the drive unit is fixedly mounted in the leg formed on the L-shaped support unit and the clamping unit can be attached releasably in a predetermined position to complete the workpiece spindle headstock.

For reliable positioning and attaching the units of the clamping device to each other to form the workpiece spindle headstock, positioning means and attaching means are provided. For this purpose, the support unit comprises interface means for positioning and attaching the releasably attached unit, for example the clamping unit, such that the interchange of the unit can be performed with high precision.

In order to position the releasably attached unit to the supporting surface of the support unit, in particular the clamping unit, positioning means comprise guide pins protruding at predetermined positions from the supporting surface of the support unit. The guide pins led (i.e. received) in corresponding guide bushes provided on a contact surface, in particular on the clamping unit. This arrangement can be as well vice versa. The guide pins can be formed as circularly cylindrical bodies. Further forms such as prism are as well possible. The guide bushes can be formed by roll bodies held in a cage, wherein the roll bodies can be balls or sliders. Alternatively, the support unit can consist an isostatic interface providing six contact points for the isostatic mount, in general used to move and hold part of a structure in a desired position relatively to the rest of the structure. The contact points can be provided by rolls or balls hold in a V-shaped groove. Alternatively, the positioning can be provided by positively mounting such that a supporting surface does not have to be plane but can be configured as a freeform surface pair.

For the purpose of releasably attaching one of the clamping unit and drive unit to the support unit the provided fastening means at the interface between the supporting surface and the contact surface can be designed as bayonet catch, snap lock or threaded lock.

In order to hold a workpiece in the clamped position the actuating device is provided such that an axial clamping force is generated and applied to the clamping anvil. For the purpose of generating the clamping force a power source is used, which can be a hydraulic or pneumatic cylinder unit. In particular, the hydraulic cylinder unit is arranged preferably outside the support unit and extends substantially parallel to the supporting surface. The actuating device comprises an actuating rod connected to transmission means for transmitting the generated force of the actuating device to the clamping unit. The transmission means can be coupled to the clamping anvil via an arm of a lever device in such a way that the clamping anvil moves axially as a response to pivot movement of the lever device. The lever device can be coupled to the actuating rod of the actuating device, which is mounted on the machine table of the grinding machine. The pivot of the lever is mounted in a bearing member, which is fixedly mounted in the clamping unit.

According to one embodiment of the invention, the lever device comprises two parts, which can be exactly positioned and connected to each other to form the lever device connectable to the clamping device. A first part comprising the pivot and the connection to the actuating rod of the actuating device is fixedly mounted in the clamping device, in particular in the support unit. The second part, which comprises the arm to be connectable to the clamping anvil, is provided to be releasably mounted, in particular releasably connected to the first part and releasably connected to the clamping unit. Therefore, it is possible to interchange the second part of the lever device in accordance with the interchange of the clamping device.

According to one embodiment of the invention, measuring means are provided such to perform measurements on the clamped workpiece, in particular on the blank workpiece before machining, during and after finishing of the machining process. The measuring means are configured that position and orientation of the blank workpiece clamped in the clamping device can be determined and furthermore, during machining dimension values of the workpiece can be detected such that the machining process performed on the grinding machine can be controlled and adapted.

According to one embodiment of the invention, the clamping device comprises a covering, in particular a cover element, releasably attached at one side of the clamping unit to provide a sealing towards the environment. Furthermore, depending on the design and/or material of the cover element, the attachable cover element can contribute to increase the stiffness of the clamping unit and finally of the clamping device. Alternatively, the cover element can be made of a flexible material such that the precision of the system is not influenced. Further, if the cover element is machined with high precision the system is not influenced by it in respect of deformation and precision of high quality is maintained. Furthermore, the cover element can be equipped with an adjustment system allowing deforming the clamping device in a controlled way such that a relative position between the drive anvil and the clamping anvil can be adjusted. For example, adjusting screws can be provided, generating a force such to adjust a relative position between clamping unit, drive unit and/or support unit.

BRIEF DESCRIPTION OF THE DRAWINGS

Preferred embodiments of the invention are now described in more detail with reference to the enclosed drawings, given by way of non-limiting example, wherein.

DETAILED DESCRIPTION OF THE EXEMPLARY EMBODIMENTS

In the different figures of this invention and its part, like details are indicated by like reference numbers throughout the figures and its specification. The reference number 1 indicates a clamping device according to the invention in its entirety.

Figure 1:
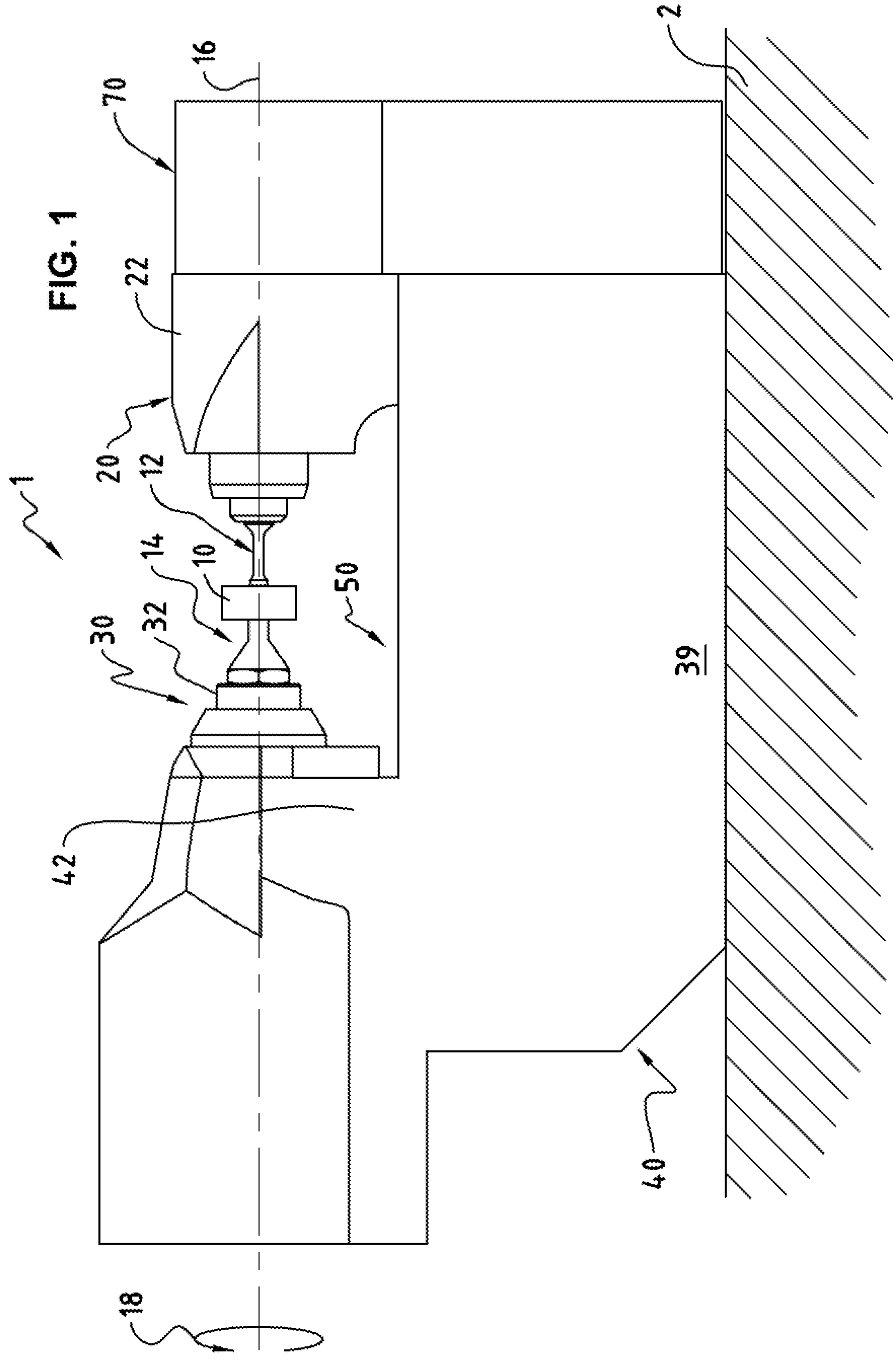
FIG. 1 shows a schematic side view of a clamping device of a first embodiment.

FIG. 1 shows a schematic side view of a clamping device 1 designed as a part of a grinding machine, in particular comprising a cup-shaped grinding wheel to machine a workpiece 10, such as a cutting tool clamped in the clamping device 1. A rotary plate 2 on a machine bed can be moved in a direction of a first rotational axis, identified as a C-axis (not shown). Furthermore, the clamping device 1 can be pivoted about a B-axis 18. Thanks to a pivoting movement by rotating the clamping device 1 about a A-axis (not shown), perpendicular to the B-axis 18 and thanks to translational and/or rotational movements of the grinding wheel about at least the X-axis and an Y-axis (not shown) the peripheral surface of the clamped workpiece 10 can be theoretically ground. The rotary plate 2 of the grinding machine bears a workpiece spindle headstock comprising inter alia the clamping device 1.

The workpiece 10, such as a cutting tool, in particular an indexable insert to be ground can be affixed to, centered and securely clamped on the clamping device 1, in particular between a clamping anvil 12 and a drive anvil 14. The clamping anvil 12 is supported in a clamping device holding element 22 of a clamping unit 20 and movable in translation along a clamping axis, identified as 16 to apply a clamping force. The drive anvil 14 is supported in a drive unit 30 and is connectable to a drive axis, the B-axis 18, of the grinding machine. Thus, during grinding the workpiece 10 can be rotated about the B-axis 18.

Not shown in FIG. 1, arranged at a distance from the rotary plate 2 does a grinding spindle headstock comprise inter alia a cup-shaped grinding wheel, wherein the grinding spindle headstock can be pivoted and moved relative to the rotary plate 2. Therefore, in the grinding machine for performing grinding of the workpiece 10 a plurality of controlled movements are mutually coordinated with one another.

According to a first embodiment of the clamping unit 1, the workpiece spindle headstock comprises the drive unit 30 and a support unit 40, which are not shown in further details. According to the FIG. 1, the support unit 40 is designed in L-shape with one portion, protruding substantially perpendicular from a support plate 39 and identified as a first leg 42. In the first leg 42, a bore is provided, configured as a bearing bore, such that an axis of the bore is aligned coaxially with the clamping axis 16 and extend parallel to a longitudinal extension of the support plate 39. In the bore of the first leg 42, the drive unit 30 is rotatably mounted consisting of the drive anvil 14, comprising a drive shaft 32 and an interchangeable drive pin 34. The drive shaft 32 can be inserted with a drive cone into a receiving cone of the B-axis 18, wherein the B-axis 18 can be rigidly supported by a B-axis bearing of the drive holding element 30 to provide very exact concentricity. The workpiece 10 can be fixedly mounted on the drive pin 34 by connection means.

According to the first embodiment, shown in FIG. 1 as a counterpart of the drive anvil 14 the clamping anvil 12 is provided, supported in the clamping unit 20 such that it is guided free of play axially and rotationally freely movable. The workpiece 10, in particular the indexable insert can be clamped between the drive anvil 14 and the clamping anvil 12 by arranging the workpiece 10 centered on the B-axis 18 and the clamping anvil 12 is moved by force against the drive anvil 14, arranged as a counter ram. According to the first embodiment, the clamping unit 20 is a separate or individual part, which can be releasably or slidably attached the support unit 40 to form the workpiece spindle headstock of the grinding machine. The clamping unit 20 is mounted to the support unit 40 in such a manner, that the axis of the clamping anvil 12 and the drive anvil 14 are aligned to each other and aligned with the clamping axis 16. For this purpose, the support unit 40 can provide on a contact surface 50 with positioning means 60 (not shown in FIG. 1).

The clamping force provided by the clamping unit 20 can be introduced in various manner, for example can be carried out by an actuating device (not shown in FIG. 1). The actuating device can comprise a power source, like a pneumatic or hydraulic cylinder unit, such that the movement of an actuating rod is transmitted via transmission means to the clamping device 1, in particular to the clamping anvil 12. Further details of the transmission means will be described later.

Furthermore, to provide sealing of the clamping unit 20 towards the environment a cover element 70 is releasably attached to the clamping unit 20. Depending on the design and/or material of the cover element 70, the attachable cover element 70 can contribute to increase the stiffness of the clamping unit 20 and finally of the clamping device 1.

Figure 2:
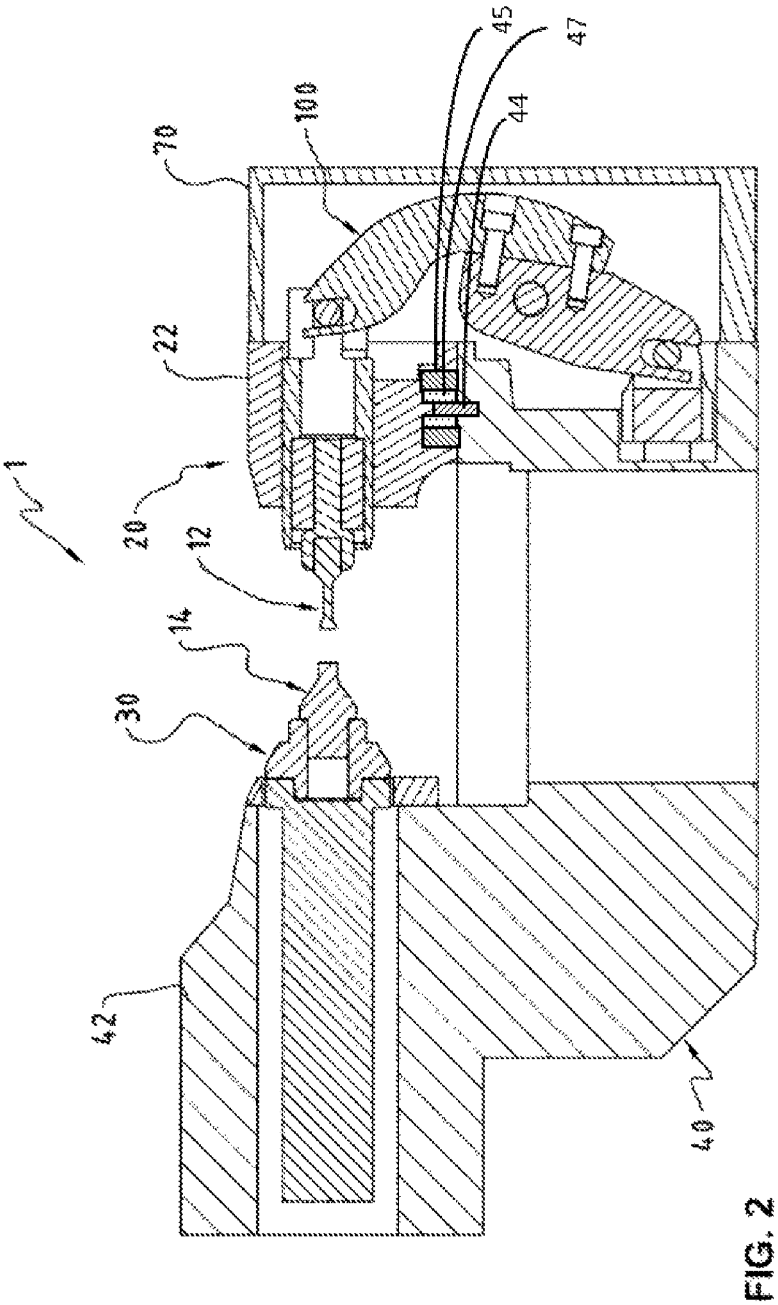
FIG. 2 shows a schematic sectional view of the clamping device of the first embodiment.

In FIG. 2, a sectional schematic view of the clamping device 1 of the first embodiment is shown. As shown the drive anvil 14 and the clamping anvil 12 can be designed as being interchangeable. In FIG. 2 the clamping anvil 12 as well as the clamping unit 20 and the drive anvil 14 are designed in a so-called short version. With this short version, the space between the clamping unit 20 and the drive unit 30 is small such that the construction of the clamping device 1 is compact and stiff. With this design of the clamping device 1, the grinding machine offers an increased stiffness and is in particular suitable to perform high-speed grinding operations on the workpiece 10 clamped by the clamping unit 1. Also illustrated in FIG. 2, a guide pin 44 is received by a guide bush 45. The guide bush 45 is shown to be formed as roll bodies held in a cage 47, wherein the roll bodies can be balls, rollers or sliders.

Figure 5:
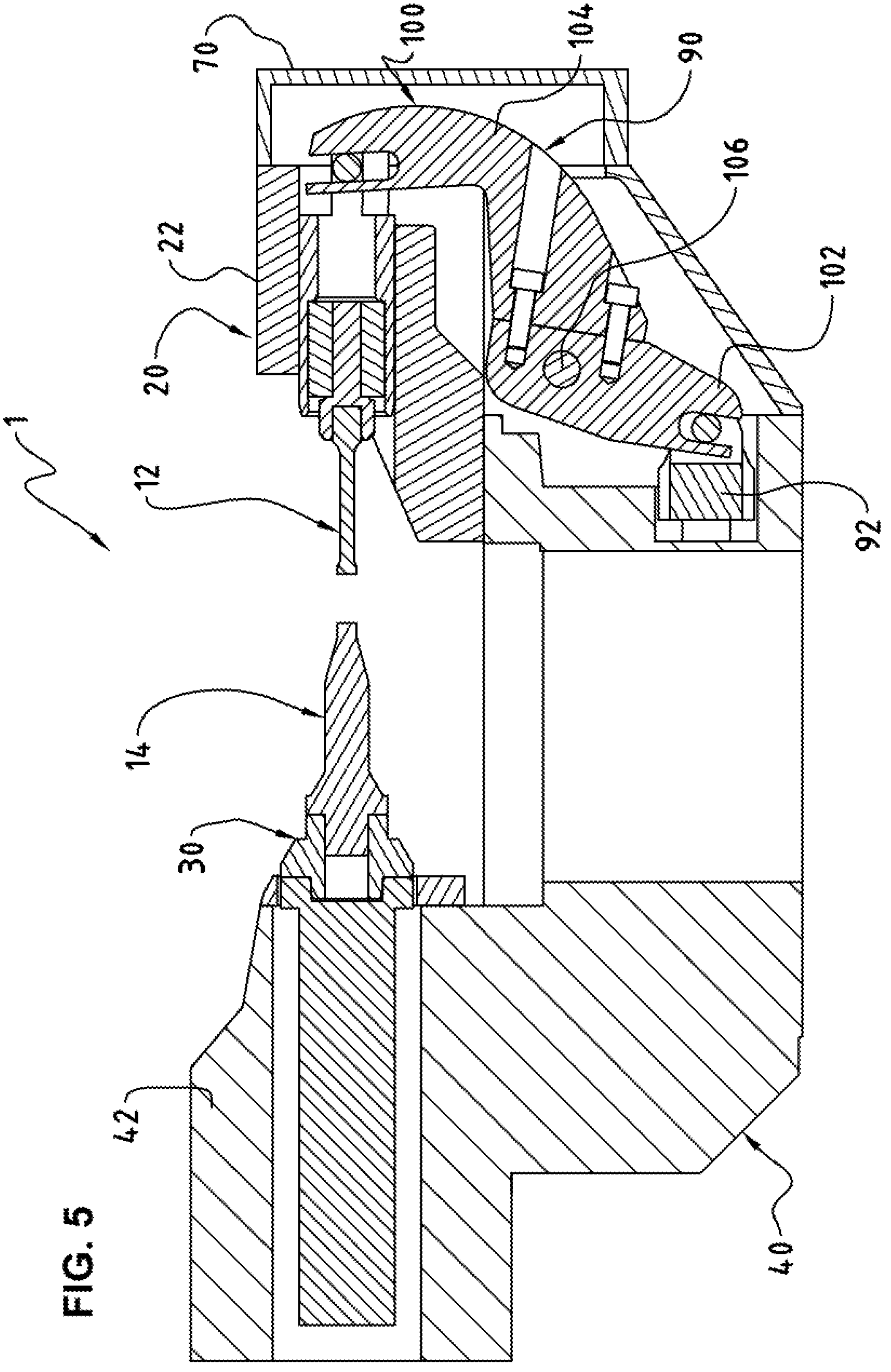
FIG. 5 shows a schematic sectional view of the clamping device of the second embodiment.

Furthermore, for applying a clamping force transmission means are provided inter alia comprising a lever unit 100, described in further detail according to FIG. 5.

Figure 3:
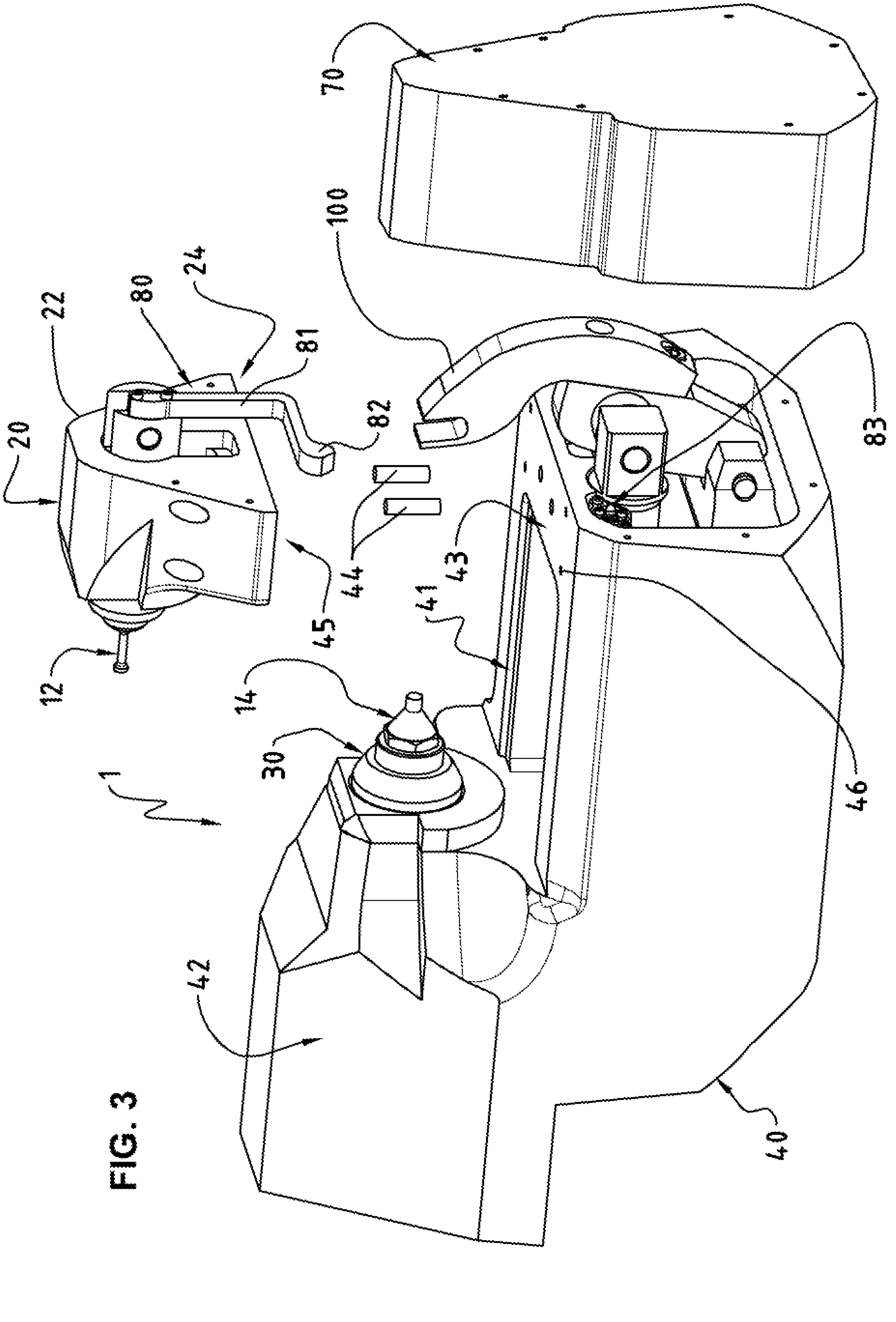
FIG. 3 shows an at least partially exploded perspective view of the clamping device of the first embodiment.

FIG. 3 shows a perspective view of the clamping device 1 according to the first embodiment, wherein elements such as the support unit 40 and the clamping unit 20 as well as the cover element 70 are shown separated to one another. The support unit 40 is formed in L-shape with the first leg 42 to support the drive unit 30. According to the first embodiment of the clamping device 1, the clamping unit 20 is provided as an individual element such that the workpiece spindle headstock can be described as an assembly or a mounted group. The clamping unit 20 is supported in the clamping holding element 22, wherein the clamping holding element 22 provides a contact surface 24, which is orientated towards a supporting surface 41 of the support unit 40. In order to position the releasable clamping unit 20 to the supporting surface 41 of the support unit 40 an interface 43 is provided with positioning means such as guide pins 44 protruding at predetermined positions from the interface 43 of the support unit 40. The guide pins 44 led (i.e. received) in corresponding guide bushes 45 (not shown) provided on the contact surface 24 of the clamping unit 20. This arrangement can be as well vice versa. The guide pins 44 can be formed as circularly cylindrical bodies. Further forms such as prism are as well possible. The guide bushes 45 can be formed by roll bodies, held in a cage, wherein the roll bodies can be balls, rollers or sliders. Furthermore, for fastening the clamping unit 20 to the support unit 20, fastening means 46 can be provided.

The clamping unit 1 of the invention comprises measurement means to detect in particular the thickness of the workpiece 10 clamped in a secured manner between the clamping anvil 12 and the drive anvil 14. Therefore, a measurement device 80 is provided comprising a measurement probe 83, whereby the measuring means 80 are connectable with the clamping unit 20, which in this embodiment is the releasably attached to the support unit 40. The measuring means 80 comprise a measuring lever 81 and a measuring head 82. The contact of the measuring lever 81 with the measuring head 82 or measuring probe can be configured in a prestressed manner by a spring element. For example, the contact between the measuring lever 81 and the measuring head 82 can be designed as between balls, between ball and plane, between rolls and/or roll and plane, etc. Furthermore, the measuring head 82 and the measuring probe 83 do not need direct contact for measuring but can be provided for optical measuring. Different materials are applicable for the elements in contact such as hardened steel, ceramic, sapphire or carbide.

Figure 4:
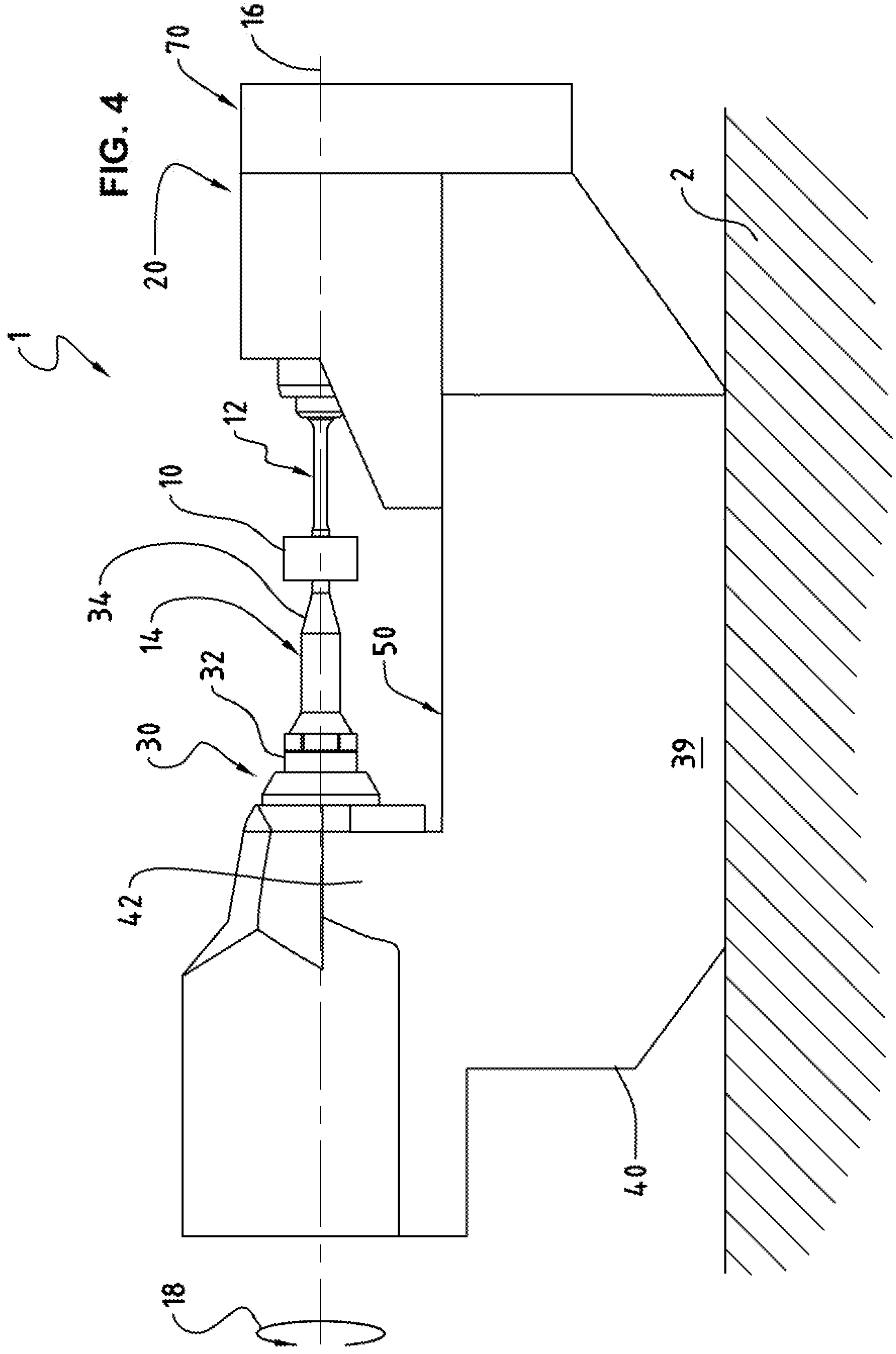
FIG. 4 shows a schematic side view of a clamping device of a second embodiment.

In FIG. 4, a schematic side view of the clamping device 1 according to a second embodiment is shown. The second embodiment of the clamping device 1 shows a so-called long version of it. In particular, the clamping unit 20 shows another design and the drive anvil 14 and/or the clamping anvil 12 protrude further out of their bearings such that a clearance between the drive unit 30 and the clamping unit 20 is larger than provided as in the short version according to the first embodiment. In this long version of the clamping device 1, not only the drive anvil 14 and the clamping anvil 12 are designed with a long longitudinal extension but also the design of clamping unit 20 itself differs from that of the short version. In other words, the free space on both sides of the clamped workpiece 10 is increased for its positioning towards the cup-shaped grinding wheel. To provide stiffness to the configuration in this long version the clamping unit 20 differs from the short version of the clamping unit 20 according to FIGS. 1 to 3.

FIG. 5 shows a sectional view of the clamping device 1 according to the second embodiment. To transmit an actuating force of an actuating unit 92 such as an actuating cylinder unit, supported in the support unit 40 of the clamping device 1, transmission means 90 are provided such that a clamping force can be provided by the clamping unit 20 for securely clamping the workpiece 10 between the clamping anvil 12 and the drive anvil 14. The actuating unit 92 comprises an actuating rod (not shown in detail) which is axially displaceable, acted upon a spring force and which is connected to the clamping unit 20 via a lever device 100. Alternatively, the actuating unit 92 can be configured as a double-acting cylinder. The lever device 100 comprises a first arm 102 and a second arm 104 releasably connected to the first arm. The first arm pivots around a shaft 106, pivoted in a bearing member provided at the support unit 40 of the clamping device 1. The second arm 104 is connectable to the clamping anvil 12 such that the clamping anvil 12 moves axially to the clamping axis as a response to the pivot movement of the first arm 102 and therefore as a response of the actuation of the actuating unit 92. According to the design of the lever device, the first arm 102 is arranged such to remain in the support unit 40 and the second arm 104 is arranged such to be interchangeable. Due to this, the lever unit 100 can be adapted to the version of the clamping unit 20, in particular to the short version of the clamping unit 20 of FIGS. 1 to 3 or to the long version of the clamping unit 20 of FIGS. 4 to 6.

Figure 6:
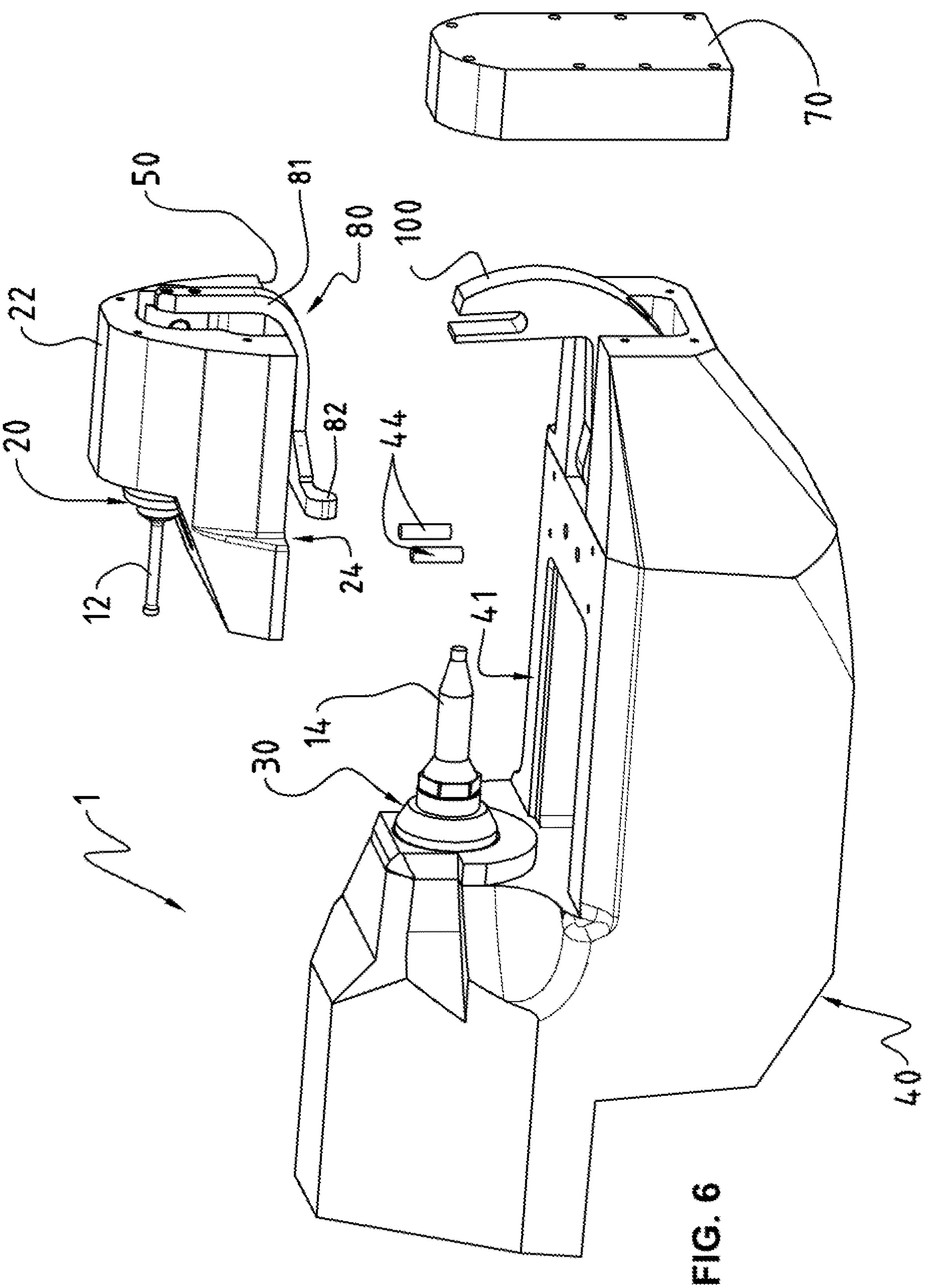
FIG. 6 shows an at least partially exploded perspective view of the clamping device of the second embodiment.

In FIG. 6, a perspective view of the clamping device 1 according to the second embodiment, wherein elements such as the support unit 40 and the clamping unit 20 as well as the cover element 70 are shown separated to one another is shown. The clamping unit 20 provides the contact surface 24 for mounting the clamping unit 20 to the support unit 40, in particular to the supporting surface 41. Therefore, the supporting surface 41 and/or the contact surface 24 are provided with guide means 50 corresponding to each other. Furthermore, the interface 43 of the support unit 40 for positioning and mounting the clamping unit 20 is provided as already described in accordance with FIG. 3.

Figure 7:
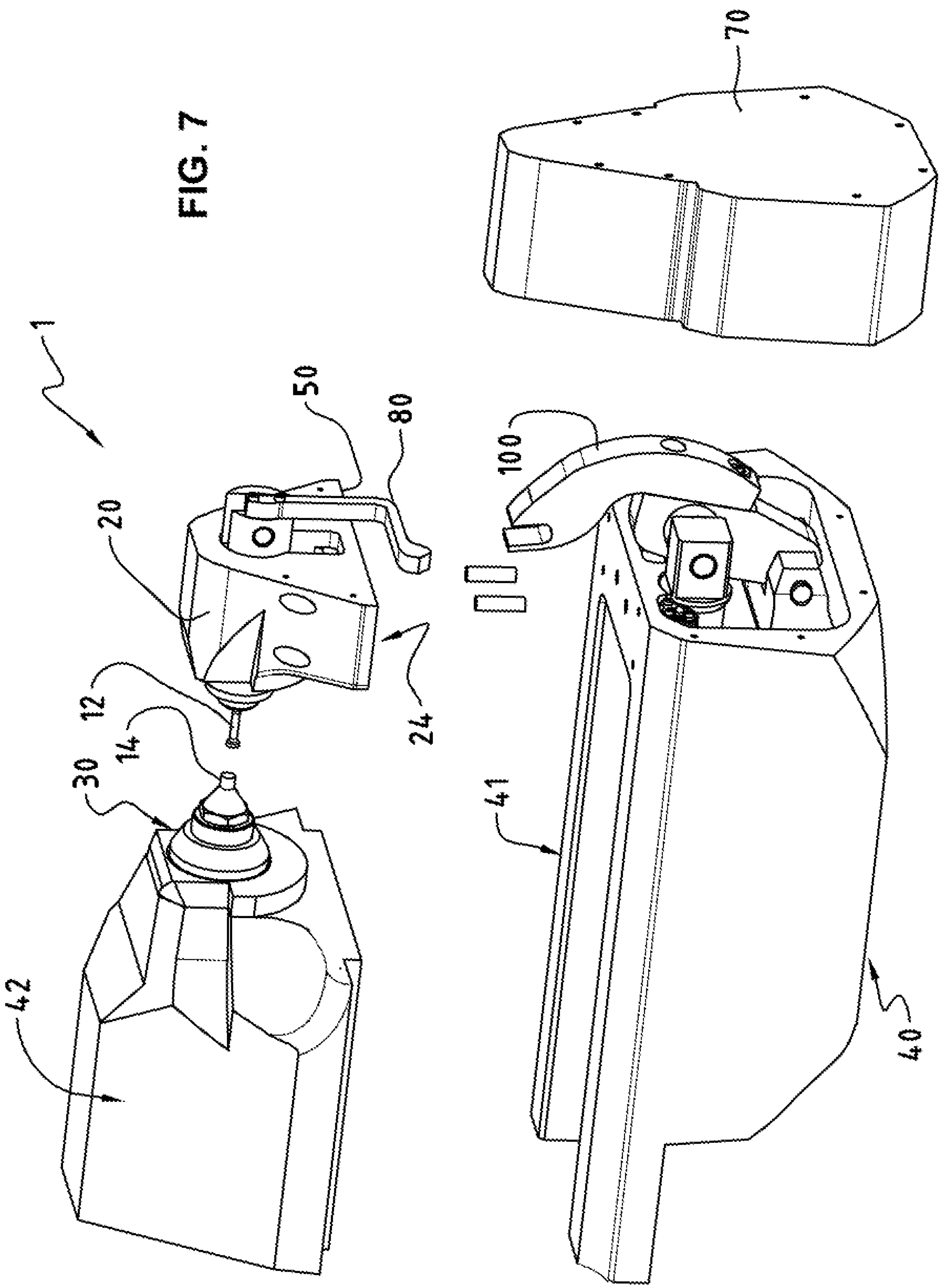
FIG. 7 shows a partially exploded perspective view of a clamping device of a third embodiment.

FIG. 7 shows a partially exploded view of the clamping device 1 of a third embodiment. According to the third embodiment the drive unit 30, the clamping unit 20 and the support unit 40 are provided as individual elements, which can be releasably mounted to each other. In this embodiment the support unit 40 can be provided with linear guide elements such that the drive unit 30 and/or the clamping unit 20 can be slidable towards each other in a direction parallel to the clamping axis 16 and can be securely fixed in a position adjusted to the clearance between the drive unit 30 and the clamping unit 20 necessary for grinding the workpiece 10 with a cup-shaped grinding wheel at every surface to be machined.

Although the present disclosure has been described with reference to particular means, materials and embodiments, one skilled in the art can easily ascertain from the foregoing description the essential characteristics of the present disclosure, while various changes and modifications may be made to adapt the various uses and characteristics as set forth in the following claims.

The invention claimed is:

1. A clamping device for holding a workpiece during machining in a grinding machine, wherein the clamping device comprises:

a support unit adapted to be mounted on the grinding machine, a clamping unit comprising a clamping anvil supported in a clamping anvil holding element and translationally drivable to apply a clamping force parallel to a clamping axis, a drive unit comprising a drive anvil supported in a drive axis and rotationally drivable for rotary orientating the workpiece by the drive axis, a measuring lever, and a measuring head which is in contact with the measuring lever and is configured to be actuated by the measuring lever, the measuring head configured to measure geometries of the workpiece to be held in a clamped position by the clamping device, wherein the clamping unit and the drive unit are provided as individual components, which are releasably or slidably attached to the support unit to form a workpiece spindle headstock of the grinding machine, wherein the measuring lever is arranged in the clamping unit and is provided to actuate the measuring head arranged in the support unit.

2. The clamping device of claim 1, wherein at least one of the clamping unit or the drive unit is attached to the support unit via guide pins, said guide pins protruding at predetermined positions from the support unit and being adapted to be received in corresponding guide bushes provided on a respective contact surface on the clamping unit and/or the drive unit, or said guide pins protruding at predetermined positions from the clamping unit and/or the drive unit and being adapted to be received in corresponding guide bushes provided on a respective contact surface on the support unit.

3. The clamping d ice according to claim 2, wherein the guide pins are formed as circularly cylindrical bodies and the guide bushes are formed by roll bodies held in a cage, wherein the roll bodies can be balls or sliders.

4. The clamping device according to claim 2, wherein the clamping device further comprises an actuating unit with an actuating rod for generating the clamping force and a transmission for transmitting the clamping force to the clamping anvil.

5. The clamping device according to claim 4, wherein the actuating unit is integrally arranged in the support unit and is provided as a pneumatic, hydraulic or electromagnetic cylinder unit.

6. The clamping device according to claim 4, wherein the transmission comprises a lever device for transmitting the clamping force generated by the actuating unit to the clamping anvil of the clamping device.

7. The clamping device according to claim 1, wherein the support unit provides a guidance to slidably attach at least one of the clamping unit or the drive unit and an attachment to securely fix the clamping unit and/or the drive unit at a predetermined position, such that a clearance between the clamping unit and the drive unit is adjustable in a longitudinal direction of the clamping axis.

8. The clamping device according to claim 1, wherein the support unit has an L-shape with one leg perpendicularly protruding from a supporting surface, wherein in said one leg a bore is provided for supporting the clamping unit or the drive unit and the other of the clamping unit and the drive unit is releasably attached to the supporting surface of the support unit.

9. The clamping device according to claim 8, wherein the support unit further comprises a fastener at an interface for releasably attaching at least one of the clamping unit and the drive unit.

10. The clamping device according to claim 9, wherein the fastener comprises a bayonet catch, snap lock or threaded lock.

11. The clamping device according to claim 1, wherein the clamping device further comprises an actuating unit with an actuating rod for generating the clamping force and a transmission for transmitting the clamping force to the clamping anvil, wherein the transmission comprises a lever device for transmitting the clamping force generated by the actuating unit to the clamping anvil of the clamping device, and wherein the lever device comprises a first arm adapted to be mounted to the support unit and a second arm adapted to be exchangeably mounted to the clamping unit, the first arm and the second arm being releasably connected to each other.

12. The clamping device according to claim 11, wherein the actuating unit is integrally arranged in the support unit and is provided as a pneumatic, hydraulic or electromagnetic cylinder unit.

* * * * *